United States Patent

Kolling et al.

[11] 3,714,231
[45] Jan. 30, 1973

[54] PRODUCTION OF 2-ACYLOXY-THIONOBENZAMIDES

[75] Inventors: Heinrich Kolling; Jurgen Kurz, both of Wuppertal-Elberfeld, Germany

[73] Assignee: Farbenfabriken Bayer Aktiengesellschaft, Leverkusen, Germany

[22] Filed: Oct. 9, 1969

[21] Appl. No.: 865,192

[30] Foreign Application Priority Data

Oct. 25, 1968 Germany.................P 18 05 156.4

[52] U.S. Cl. ..............260/477, 260/410.5, 260/469, 260/470, 260/473 R, 260/473 S, 260/479 R, 424/308
[51] Int. Cl..............................................C07c 69/78
[58] Field of Search ...260/479 R, 551 R, 551 S, 477, 260/558 S, 558 D, 479 S

[56] References Cited

UNITED STATES PATENTS 3,147,300  9/1964  Schroufstatter.....................260/479
2,703,332  4/1955  Bindler...............................260/479

FOREIGN PATENTS OR APPLICATIONS 1,522,005  4/1968  France..............................260/551 S

OTHER PUBLICATIONS

Journal of the Indian Chemical Society, Vol. XL, No. 10, pp. 897, 898 (1963)
Schraufstetter et al., Z. Naturforsch, Vol. 16b
Chem. Abs., Vol. 69, 1968, Col. 94089k; Vol. 68, Col. 43165d, Vol. 68, Col. 77558z

*Primary Examiner*—Lorraine A. Weinberger
*Assistant Examiner*—R. S. Weissberg
*Attorney*—Jacobs & Jacobs

[57] ABSTRACT

2-Acyloxy-thionobenzamides of the formula:

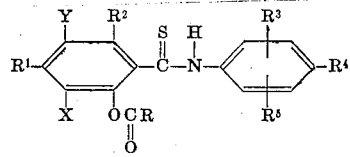

wherein
$R^1$ and $R^2$ are the same or different and are hydrogen, lower alkyl, or lower alkoxy,
$R^3$, $R^4$, $R^5$, X and Y are the same or different and are hydrogen, halogen, lower alkyl, lower alkoxy, lower alkylmercapto, hydroxyl, nitro or halo-alkyl, and
R is unsubstituted or substituted alkyl, unsubstituted or substituted aryl or unsubstituted or substituted aralkyl, are produced by reacting an imide chloride of the formula:

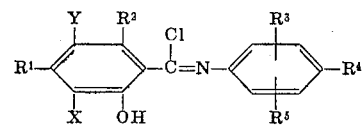

wherein
$R^1$, $R^2$, $R^3$, $R^4$, $R^5$, X and Y are as above defined, with a thioacid of the formula:

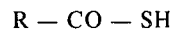

R — CO — SH wherein
R is as above defined, optionally in the presence of an inert organic solvent at a temperature of from about 20°C to about 250°C. The 2-acyloxy-thionobenzamides of the present invention are useful in human and veterinary medicine and are particularly useful in treating adult liver-flukes in sheep.

3 Claims, No Drawings

PRODUCTION OF 2-ACYLOXY-THIONOBENZAMIDES

The present invention is concerned with 2-acyloxy-thionobenzamides. More particularly, the present invention is concerned with 2-acyloxy-thionobenzamides of the formula:

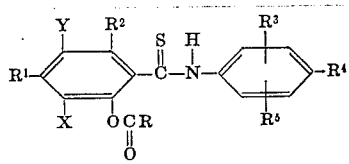

wherein
$R^1$ and $R^2$ are the same or different and are hydrogen, lower alkyl or lower alkoxy,
$R^3$, $R^4$, $R^5$, X and Y are the same or different and are hydrogen, halogen, lower alkyl, lower alkoxy, lower alkylmercapto, hydroxyl, nitro or halo-alkyl, and
R is unsubstituted or substituted alkyl, unsubstituted or substituted aryl or unsubstituted or substituted aralkyl.

These 2-acyloxy-thionobenzamides can be produced by reacting imide chlorides of the formula:

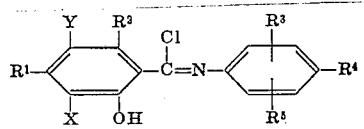

wherein
$R^1$, $R^2$, $R^3$, $R^4$, $R^5$, X and Y are as above defined, with a thioacid of the formula:

wherein
R is as defined above,
optionally in the presence of an inert organic solvent at a temperature range of from about 20°C to about 250°C.

When $R^1$ and $R^5$, X and Y are lower alkyl or lower alkoxy, it is preferred that these moieties contain from one to six carbon atoms and particularly one to four carbon atoms. When $R^1$ to $R^5$, X and Y are halogen, the preferred halogens are fluorine, chlorine and bromide. When $R^1$ to $R^5$, X and Y are haloalkyl, it is preferred that the alkyl moiety is a lower alkyl moiety and the halo substituents may be the same or different. It is particularly preferred for the haloalkyl moiety to have one or two carbon atoms in the alkyl portion. The preferred halogens are fluorine, chlorine and bromine.

When R is unsubstituted or substituted alkyl, it may be straight or branched chain alkyl which may contain double bonds preferably one or two. The preferred unsubstituted or substituted alkyls are those of one to 18 carbon atoms and particularly those of one to 12 carbon atoms and especially those of one to four carbon atoms. When the alkyl moieties are unsaturated, it is preferred that the chain length be two to 18, two to 12 or two to four, respectively. The unsubstituted or substituted, saturated or unsaturated alkyl moieties may be substituted by lower O-alkyl and lower S-alkyl, halogen, preferably fluorine, chlorine or bromine, or hydroxyl. When R is an unsubstituted or substituted aryl moiety, it is preferred that it contain up to 12 carbon atoms and preferably six or 10 carbon atoms in the ring system. This moiety may be substituted by halogen, preferably fluorine, chlorine or bromine, lower alkyl, lower alkoxy or lower S-alkyl as well as haloalkyl, wherein the preferred halo substituents are fluorine, chlorine and bromine and the carbon atom chain length is preferably one or two carbon atoms.

When R is unsubstituted or substituted aralkyl, it is preferred that the aryl portion be of six or 10 carbon atoms and the alkyl portion be of one to four carbon atoms, particularly one or two carbon atoms. The preferred substituents are lower O-alkyl, lower S-alkyl, halogen, preferably fluorine, chlorine or bromine, or hydroxyl.

The imide chlorides used for the present process are known or can be obtained by known processes. Examples of such imide chlorides are: N-(4'-chlorophenyl)-3,5-dichloro-salicylic imide chloride, N-(2'-chloro-4'-nitrophenyl)-5-chloro-salicylic acid imide chloride, N-(2'-methyl-4'-nitro-5'-chloro-phenyl)-5-chlorosalicylic acid imide chloride, N-(2', 4', 5'-trichlorophenyl)-3,5-dichlorosalicylic acid imide chloride, N-(2'-chloro-4'-nitrophenyl)-3,5-dichlorosalicylic acid imide chloride, N-(2',6'-dichloro-4'-nitrophenyl)-3,5-dichlorosalicylic acid imide chloride, N-(2',3'-dichlorophenyl)-3,5-dichlorosalicylic acid imide chloride, N-(3',5'-dichlorophenyl)-3,5-dichlorosalicylic acid imide chloride, N-(2',5'-dichlorophenyl)-3,5-dichlorosalicylic acid imide chloride, N-(2',3'-dichlorophenyl)-3,5-dibromosalicylic acid imide chloride, N-(3',5'-dichlorophenyl)-3,5-dibromosalicylic acid imide chloride, N-(4'-chlorophenyl)-5-nitrosalicylic acid imide chloride, N-(4'-chlorophenyl)-3-nitrosalicylic acid imide chloride, N-(3'-chloro-4'-methyl-phenyl)-3,5-dichlorosalicylic acid imide chloride, N-(3'-methyl-4'-chloro-phenyl)-3,5-dichlorosalicylic acid imide chloride, N-(3', 4'-dimethyl-phenyl)-3,5-dichlorosalicylic acid imide chloride, N-phenyl-3,5-dichlorosalicylic acid imide chloride, N-(4'-chlorophenyl)-3,5-dibromosalicylic acid imide chloride, N-(2', 4'-dichlorophenyl)-3,5-dibromosalicylic acid imide chloride, N-(3',4'-dichlorophenyl)-3,5-dibromosalicylic acid imide chloride, N-(2', 4', 5'-trichlorophenyl)-3,5-dibromosalicylic acid imide chloride, N-(2',4',6'-tribromophenyl)-3,5-dibromosalicylic acid imide chloride, N-(2',4', 6'-trichlorophenyl)-3,5-dibromosalicylic acid imide chloride, N-(2',4',6'-tribromophenyl)-3,5-dichlorosalicylic acid imide chloride, N-(2'-methyl-4'-chlorophenyl)-3,5-dichlorosalicylic acid imide chloride, N-(4'-bromophenyl)-3-bromo-5-chlorosalicylic acid imide chloride, N-(4'-bromo-phenyl)-3,5-dibromo-4-methyl-salicylic acid imide chloride, N-(3', 4'-dichloro-phenyl-3,5-dibromo-4-methylsalicylic acid imide chloride, N-(3', 4'-di-chloro-phenyl)-3-nitro-salicylic acid imide chloride, N-(2'4', 5'-trichloro-phenyl)-3-nitro-salicylic acid imide chloride, N-(2'-methyl-4'-chloro-phenyl)-3-nitro-salicylic acid imide chloride, N-(4'-bromo-phenyl)-3,5-dichlorosalicylic acid imide chloride, N-(3'-acetoxy-4'-chlorophenyl)-3,5-dichlorosalicylic acid imide chloride, and N-(2'-chloro-4'-acetoxy-phenyl)-3,5-dichlorosalicylic acid imide chloride.

The thioacids used for the present process are known or can be obtained by known processes. Examples of such thioacids are: thioacetic acid, chlorothioacetic acid, dichloro-, trichloroacetic acid, thiobutyric acid, thioisobutyric acid, thio-isovaleric acid, thiomyristic acid, thiopalmitic acid, thiobenzoic acid, m-chloro-thiobenzoic acid, p-fluoro-thiobenzoic acid, p-nitro-thiobenzoic acid, thio-o-toluylic acid, thio-p-toluylic acid, 4-methoxy-thiobenzoic acid, phenyl-thioacetic acid, thio-β-napthoic acid, thiopropionic acid.

With a preferred method of carrying out the process according to the invention, the thioacids are not used in the pure form but in the form of the crude solutions obtained in their preparation. If they are obtained, for example, by thionolysis of corresponding acid anhydrides according to $$R-CO-O-CO-R + H_2S \rightarrow R-CO-SH + R-COOH,$$

the liberated carboxylic acid may be used at the same time as a solvent for the reaction of the imide chloride with the thioacid.

In general, the stoichiometric amount of thioacid is used per mol of imide chloride, but the former may also be used in an excess of up to 20 percent.

The reaction is generally carried out in the presence of inert organic solvents, such as e.g. benzene, toluene, xylene, chlorobenzene or of aliphatic hydrocarbons of p.b. 50° to 120°C, or also of ethers, such as e.g. dibutyl ether, dioxan, tetrahydrofuran. Suitable solvents are also the carboxylic acids corresponding to the thioacid to be reacted, provided they are liquid. However, it may also be expedient to work in the absence of solvents.

The reaction is generally completed after about 1 to 6 hours and the course of the reaction can be easily followed by noting the evolution of hydrogen chloride. The products can be worked up in the usual manner and 2-acyloxy-thiono-benzamides produced are obtained in high yields, i.e. 70 to 90 percent of theoretical in a single-stage process, and in a substantially pure state. In most cases it is unnecessary to further purify the final product and this is especially true when the process is carried out in the presence of solvents.

The process of the present invention must be regarded as particularly surprising because of the intramolecular transfer of the acyl group from the sulphur of the thioacid to the oxygen atom of the hydroxyl group would not be an expected reaction.

The 2-acyloxy-thionobenzamides of the present invention may be used in human and veterinary medicine. The compounds of the present invention are particularly useful in veterinary medicine for the treatment of liver-flukes. The effectiveness of representative compounds of the present invention against adult liver-flukes in sheep by a single oral administration is illustrated by the following table of compounds and the indicated dosage and effectiveness:

TABLE

| Compound | Dose mg/kg | Effect* |
|---|---|---|
| 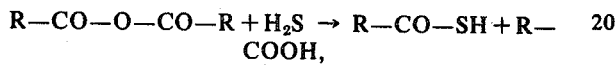 | 50<br>10<br>5 | 3<br>1<br>0 |
| Cl-○-C(=S)-NH-○-Cl with Br and O-CO-CH₃ (CH₃, Cl substituents) | 50<br>10<br>5 | 3<br>0<br>0 |
| Br,CH₃-○-C(=S)-NH-○-Cl,Cl with Br and O-CO-CH₃ | 50<br>10<br>5 | 3<br>3<br>0 |
| Cl-○-C(=S)-NH-○-Br with Br and O-CO-CH₂-CH₃ | 50<br>10<br>5 | 3<br>3<br>1 |
| Cl-○-C(=S)-NH-○-Br with Br and O-CO-CH₂-CH₂-CH₃ | 50<br>10<br>5 | 3<br>3<br>2 |
| Cl-○-C(=S)-NH-○-Cl with Br and O-C(=O)-CH₃ | 50<br>10<br>5 | 3<br>1<br>1 |
| Cl-○-C(=S)-NH-○-Br with Br and O-CO-○ | 50<br>10 | 1<br>0 |
| Cl-○-C(=S)-NH-○-Cl with Br and O-CO-○-Cl | 50<br>10<br>5 | 3<br>3<br>1 |
| Cl-○-C(=S)-NH-○-Br with Br and O-CO-CH₂-CH(CH₃)-CH₃ | 50<br>10<br>5 | 3<br>0<br>0 |

*3 = Cure
2 = Effective
1 = Trace of Effect
0 = No Effect

The process of the present invention may be illustrated by the following reaction mechanism:

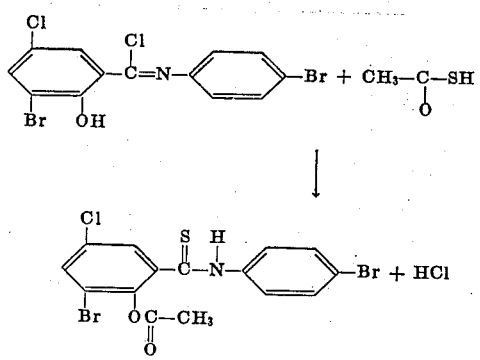

The following non-limitative examples more particularly illustrate the present invention.

EXAMPLE 1

9.1 g (1.2 mol) thioacetic acid diluted with 30 ml benzene are added dropwise at 60°C with stirring to a solution of 42.5 g (1/10 mol) N-(4'-bromophenyl)-3-bromo-5-chlorosalicylic acid imide chloride in 200 ml benzene, and the mixture is then heated at boiling temperature under reflux until the evolution of HCl is terminated, i.e. for about 6 hours. The 2-acetoxy-3-bromo-5-chloro-N-(4'-bromophenyl) thionobenzamide separates upon cooling. It is filtered off with suction and successively washed with a little benzene and petroleum ether; m.p. 181°C. The same result is achieved by working without a solvent.

EXAMPLE 2

30 g (1/10ml) N-(3'-chlorophenyl)-5-chloro-salicylic acid imide chloride are dissolved at 60°C in 100 ml toluene while stirring, and 9.1 g (1.2 mol) thioacetic acid diluted with 20 ml toluene are subsequently added dropwise. After stirring under reflux for about 6 hours, the mixture is allowed to cool and the 2-acetoxy-5-chloro-N-(3'-chlorophenyl)-thionobenzamide is filtered off with suction. It can be recrystallized from acetone or carbon tetrachloride; m.p. 181°C.

EXAMPLE 3

20 g of a 48–50 percent solution of thioacetic acid in acetic acid, obtained by thionolysis of acetic anhydride by means of hydrogen sulphide under technical conditions, are added dropwise at 60°C while stirring to 42.5 (1/10 mol) N-(4'-bromophenyl)-3-bromo-5-chloro-salicylic acid imide chloride dissolved in 200 ml benzene; the solution is heated under reflux until the evolution of HCl is terminated, and the 2-acetoxy-3-bromo-5-chloro-N-(4'-bromophenyl)-thionobenzamide is filtered off with suction after cooling; after recrystallization from carbon tetrachloride, m.p. 181°C.

In analogy with Examples 1 or 2 there are obtained:
from N-(4'-chloro-phenyl)-3-bromo-5-chloro-salicylic acid imide chloride and thioacetic acid: 2-acetoxy-3-bromo-5-chloro-N-(4'-chlorophenyl)-thionobenzamide of m.p. 178°C;
from N-(3'-methyl-4'-chloro-phenyl)-3-bromo-5-chloro-salicylic acid imide chloride and thioacetic acid: 2-acetoxy-3-bromo-5-chloro-N-(3'-methyl-4'-chloro-phenyl)-thionobenzamide of m.p. 176°C;
from N-(3',4'-dichloro-phenyl)-3,5-dibromo-4-methyl-salicylic acid imide chloride and thioacetic acid: 2-acetoxy-3,5-di-bromo-4-methyl-N-(3',4'-dichlorophenyl)-thionobenzamide of m.p. 162°C;
from N-(4'-bromo-phenyl)-3-bromo-5-chloro-salicylic acid imide chloride and thiopropionic acid: 2-propionyloxy-3-bromo-5-chloro-N-(4'-bromo-phenyl)-thionobenzamide of m.p. 166°C;
from N-(4'-bromo-phenyl)-3-bromo-5-chloro-salicylic acid imide chloride and thiobutyric acid: 2-butyryloxy-3-bromo-5-chloro- N-(4'-bromo-phenyl)-thionobenzamide of m.p. 147°C;
from N-(4'-bromo-phenyl)-3-bromo-5-chloro-salicylic acid imide chloride and thiobenzoic acid: 2-benzoyloxy-3-bromo-5-chloro-N-(4'-bromo-phenyl)-thionobenzamide of m.p. 198°C;
from N-(4'-chloro-phenyl)-3-bromo-5-chloro-salicylic acid imide chloride and m-chlorothiobenzoic acid: 2-m-chlorobenzoyloxy-3-bromo-5-chloro-N-(4'-chloro-phenyl)-thionobenzamide of m.p. 184°C;
from N-(4'-bromo-phenyl)-3-bromo-5-chloro-salicylic acid imide chloride and isothiovaleric acid: 2-isovaleryloxy-3-bromo-5-chloro-N-(4'-bromo-phenyl)-thionobenzamide of m.p. 157°C; and
from N-(4'-methoxy-phenyl)-5-chloro-salicylic acid imide chloride and phenylthioacetic acid: 2-phenylacetoxy-5-chloro-N-(4'-methoxy-phenyl)-thionobenzamide as a highly viscous oil.

What is claimed is:

1. A process for the production of a compound of the formula:

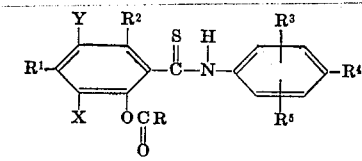

wherein
$R^1$ and $R^2$ are the same or different and are hydrogen, lower alkyl or lower alkoxy,
$R^3$, $R^4$, $R^5$, X and Y are the same or different and are hydrogen, halogen, lower alkyl, lower alkoxy, lower alkylmercapto, hydroxyl, nitro or haloalkyl, and
R is alkyl or alkenyl of up to 18 carbon atoms, unsubstituted or substituted by halogen, hydroxy, lower alkoxy or lower alkylthio, aryl of six or 10 carbon atoms, unsubstituted or substituted by halogen, hydroxy, lower alkoxy, lower alkylthio or lower alkyl, or aralkyl in which the aryl moiety has six or 10 carbon atoms and the alkyl group has one to four carbon atoms, said aralkyl group being unsubstituted or substituted by halogen, hydroxy, lower alkoxy, lower alkylthio or lower alkyl,
which comprises reacting an imide chloride of the formula:

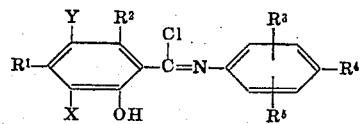

wherein
$R^1$, $R^2$, $R^3$, $R^4$, $R^5$, X and Y are as defined above, with a thioacid of the formula:

wherein
R is as defined above,
and recovering the product produced.

2. The process according to claim 1 wherein said imide chloride is reacted with said thioacid in an inert organic solvent having a boiling point from 50° to 120°C.

3. The process according to claim 2 wherein $R^1$ is hydrogen or methyl, $R^2$ is hydrogen, each of X and Y, independent of the other, is chloro or bromo, $R^3$ is hydrogen, chloro or bromo in the m-position, $R^4$ is chloro or bromo, $R^5$ is hydrogen and R is alkyl of one to four carbon atoms, phenyl or chlorophenyl.

* * * * *